(12) United States Patent
Laboy et al.

(10) Patent No.: US 7,649,842 B2
(45) Date of Patent: Jan. 19, 2010

(54) METHOD OF SELECTIVE DORMANT DATA SESSION REACTIVATION

(75) Inventors: Jose A. Laboy, Tempe, AZ (US); Joel L. Gross, Gilbert, AZ (US); Brian A. Hansche, Gilbert, AZ (US); Karl E. Miller, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 896 days.

(21) Appl. No.: 11/240,180

(22) Filed: Sep. 29, 2005

(65) Prior Publication Data

US 2007/0070889 A1 Mar. 29, 2007

(51) Int. Cl.
*H04L 1/00* (2006.01)
(52) U.S. Cl. .................. 370/234; 370/230; 370/329
(58) Field of Classification Search .......... 370/230, 370/234, 329
See application file for complete search history.

(56) References Cited

U.S. PATENT DOCUMENTS

| | | | |
|---|---|---|---|
| 5,490,252 A | 2/1996 | Macera et al. | |
| 6,304,552 B1 | 10/2001 | Chapman et al. | |
| 7,106,691 B1 * | 9/2006 | DeCaluwe et al. | 370/229 |
| 7,154,903 B2 * | 12/2006 | Sivalingham | 370/429 |
| 2005/0111367 A1 | 5/2005 | Jonathan Chao et al. | |
| 2005/0186971 A1 | 8/2005 | Ray et al. | |
| 2006/0050668 A1 * | 3/2006 | Harper et al. | 370/338 |

* cited by examiner

*Primary Examiner*—Jason E Mattis

(57) ABSTRACT

A method of selective dormant data session reactivation in a radio access network includes calculating an activation rate threshold as a function of a first plurality of packets received over a first time interval, where the first plurality of packets are coupled to reactivate at least one dormant mobile station. The second plurality of packets received in a second time interval are buffered, where each of the second plurality of packets has a destination IP address to reactivate the at least one dormant mobile station. An arrival rate of the second plurality of packets in the second time interval is compared to the activation rate threshold. If the arrival rate exceeds the activation rate threshold, the second plurality of packets may be separated into a plurality of source IP groups according to their respective source IP addresses, and progressively discarding in descending order one of the plurality of source IP groups having a highest number of the second plurality of packets until the arrival rate is below the activation rate threshold.

8 Claims, 3 Drawing Sheets

METHOD OF SELECTIVE DORMANT DATA SESSION REACTIVATION

BACKGROUND OF INVENTION

In cellular network systems, particularly CDMA cellular networks, a mobile station may be in a dormant state, where the cellular network is aware of the mobile station on the system, but currently, there is no activity with the mobile station. In other words, the mobile station is registered with the cellular network, but is in a dormant data session as no active communication sessions are taking place. An example of this is a mobile station that is registered and has been active in the cellular network, but is currently inactive without having powered off, such as a mobile station in a push-to-talk session, a mobile station awaiting a paging request, and the like.

In prior art CDMA cellular networks, Internet users may cause abnormally high paging rates by implementing malicious Internet Protocol (IP) scans of IP addresses terminated on such dormant mobile stations. Such IP scans can overload the cellular network system. These malicious IP scans may or may not be intentionally implemented to search for mobile stations in a dormant data session in order to reactivate them. However, whether intentional or not, IP scans of mobile stations in a dormant state does load a cellular network with mobile page attempts. The prior art is deficient in distinguishing these malicious users of the cellular network system from legitimate users.

There is a need, not met in the prior art, for a method of selective dormant data session reactivation. Accordingly, there is a significant need for an apparatus and method that overcomes the deficiencies of the prior art outlined above.

SUMMARY OF THE INVENTION

To overcome the deficiencies described above, a method of selective dormant data session reactivation in a radio access network is disclosed. The method includes calculating an activation rate threshold as a function of a first plurality of packets received by a packet control function operating in a radio access network over a first time interval. The first plurality of packets is coupled to reactivate at least one dormant mobile station operating in a wireless communication system. The method also includes buffering a second plurality of packets received in a second time interval, wherein each of the second plurality of packets has a destination IP address coupled to reactivate the dormant mobile station. The method compares an arrival rate of the second plurality of packets in the second time interval to the activation rate threshold. If the arrival rate exceeds the activation rate threshold, the second plurality of packets are separated into a plurality of source IP groups according to their respective source IP addresses and one of the plurality of source IP groups having a highest number of the second plurality of packets is discarded. Until the arrival rate is below the activation threshold, the method includes iteratively comparing the arrival rate of the second plurality of packets in the second time interval without the one of the plurality of source IP groups, to the activation rate threshold and if the arrival rate of the second plurality of packets in the second time interval without the one of the plurality of source IP groups exceeds the activation rate threshold, discarding the one of the plurality of source IP groups having a next highest number of the second plurality of packets.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Figure 1:
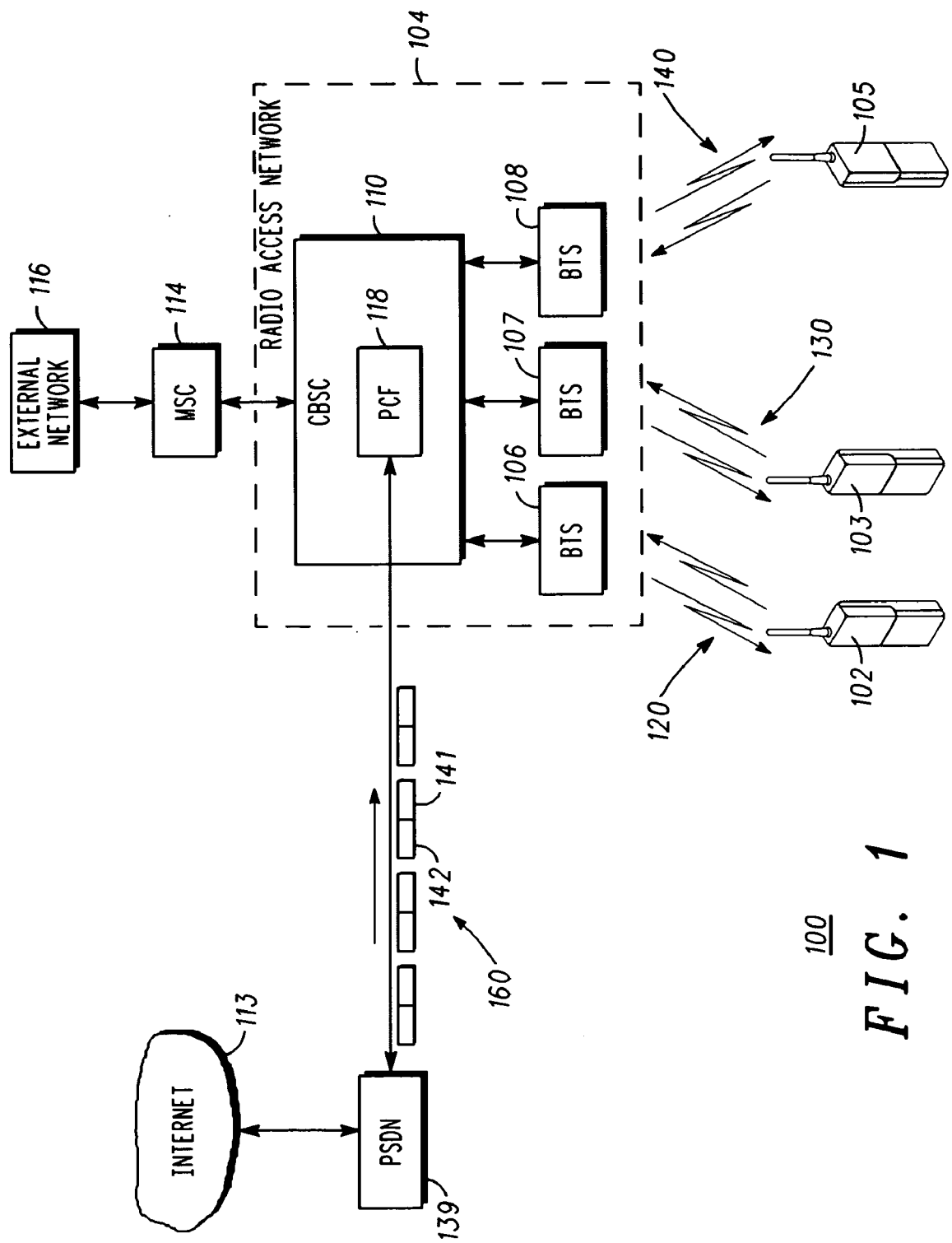
FIG. 1 representatively illustrates a block diagram of a wireless communication system in accordance with an exemplary embodiment of the present invention.

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Software blocks that perform embodiments of the present invention can be part of computer program modules comprising computer instructions, such control algorithms that are stored in a computer-readable medium such as memory. Computer instructions can instruct processors to perform any methods described below. In other embodiments, additional modules could be provided as needed.

A detailed description of an exemplary application, namely a method of selective dormant data session reactivation, is provided as a specific enabling disclosure that may be generalized to any application of the disclosed system, device and method in accordance with various embodiments of the present invention.

Wireless communication systems are well known and consist of many types including land mobile radio, cellular radiotelephone (inclusive of analog cellular, digital cellular, personal communication systems (PCS) and wideband digital cellular systems), and other communication system types. In cellular radiotelephone communication systems, for example, a number of communication cells are typically comprised of one or more Base Transceiver Stations (BTS's) coupled to one or more Base Station Controllers (BSCs) or Central Base Station Controllers (CBSCs) and forming a Radio Access Network (RAN). The BSCs or CBSCs are, in turn, coupled to a Mobile Switching Center (MSC) that provides a connection between the RAN and an external network, such as a Public Switched Telephone Network (PSTN), as well as interconnection to other RANs. Each BTS provides communication services to a mobile station (MS) located in a coverage area serviced by the BTS via a communication resource that includes a forward link for transmitting signals to, and a reverse link for receiving signals from, the MS.

FIG. 1 representatively illustrates a block diagram of a wireless communication system 100 in accordance with an exemplary embodiment of the present invention. Wireless communication system 100 includes a RAN 104 comprising multiple BTSs 106-108 that are each coupled to a CBSC 110. RAN 104 is coupled to an MSC 114, and MSC 114 is in turn coupled to an external network 116 and provides a communication link between the external network, or other RANs, and RAN 104. In an embodiment, RAN 104 is a CDMA network.

Wireless communication system 100 further includes a mobile station 102, 103, 105 that may be in a dormant data session with a BTS 106, 107, 108. That is, mobile station 102 if it is in a dormant data session, for example, is not in an active communication session with BTS 106, but is powered-up, registered and may have been recently in an active communication session with BTS 106. While RAN 104 is aware of mobile station 102, no active communication is currently occurring between mobile station 102 and RAN 104. In a dormant data session, mobile station 102 is a dormant mobile station, which is registered with RAN 104 and coupled to send or receive data via wireless link 120. Each communication link 120, 130, 140 includes a respective forward link for conveyance of signals to mobile station 102 and a respective reverse link for receipt of signals from the mobile station 102. Either mobile station 102 receiving a data packet via RAN 104, or a user of mobile station 102 sending a data packet may reactivate dormant data session. Any number of mobile stations 102, 103, 105 may be coupled to RAN 104 and be in a dormant data session.

CBSC 110 may also include Packet Control Function (PCF) 118. In an embodiment, PCF 118 is coupled to communicate packet data, particularly IP packet data, between the mobile station 102, and the Packet Data Serving Node (PDSN) 139 over an interface, the A10/A11 interface in the case of a CDMA network. Packet control function 118 may operate to maintain a reachable state between RAN 104 and mobile station 102, ensuring a consistent link for data packets, buffering of data packets arriving from PDSN 139 when wireless link resources are not in place or are insufficient to support the flow from PDSN 139, and relay data packets between the mobile station 102 and PDSN 139. PCF 118 is not limited to a PCF in a CDMA network and may include one or more nodes in other radio access networks such as GSM, TDMA, and the like, that perform a substantially similar function.

PDSN 139 may be coupled to operate as the gateway from the RAN 104 into a public and/or private packet network, for example and without limitation, the Internet 113. In an embodiment, PDSN 139 may act as a network access server, home agent, foreign agent, and the like. PDSN 139 may manage the radio-packet interface between RAN 104 and Internet 113, provide IP addresses for the subscriber's mobile station 102, 103, 105, perform packet routing, actively manage subscriber services based on profile information, authenticate users, and the like.

In an embodiment, PCF 118 may be coupled to receive incoming data packets addressed to a dormant mobile station 102. In other words, PCF 118 may be coupled to receive incoming data packets addressed to reactivate a dormant data session with mobile station 102. Such incoming data packets may originate from a packet data network external to RAN 104, such as users connected to the Internet 113, and the like. As an example, incoming data packets may be incoming data coupled with a push-to-talk session, paging request, and the like. For example, mobile station 102 may be registered with RAN 104 but have no currently active data sessions in progress, i.e. mobile station 102 is in a dormant data session. The arrival of a data packet, for example as part of a paging request, may operate to reactivate dormant data session by reactivating dormant mobile station 102.

In an embodiment, PCF 118 is coupled to examine incoming data packets and determine if reactivation of a dormant data session with a dormant mobile station is permitted. In an exemplary embodiment, PCF may scan incoming data packets, including source IP addresses and destination IP addresses to determine if an incoming data packet is the product of a malicious IP scan or from a legitimate user.

In an illustrative embodiment, a plurality of packets 160 may be received by PCF 118 via PDSN 139. In an embodiment, plurality of packets 160 may include any number of data packets, for example and without limitation IP packets. Each of plurality of packets 160 may have a source IP address 142 and a destination IP address 141. The source IP address 142 is an indication of the origination of the data packet, while the destination IP address 141 may be coupled to reactivate one or more dormant mobile stations 102, 103, 105. In other words, one or more of plurality of packets 160 may be addressed to reactivate a dormant data session with one or more of dormant mobile stations 102, 103, 105. This can be, for example, a paging request, and the like.

Figure 2:
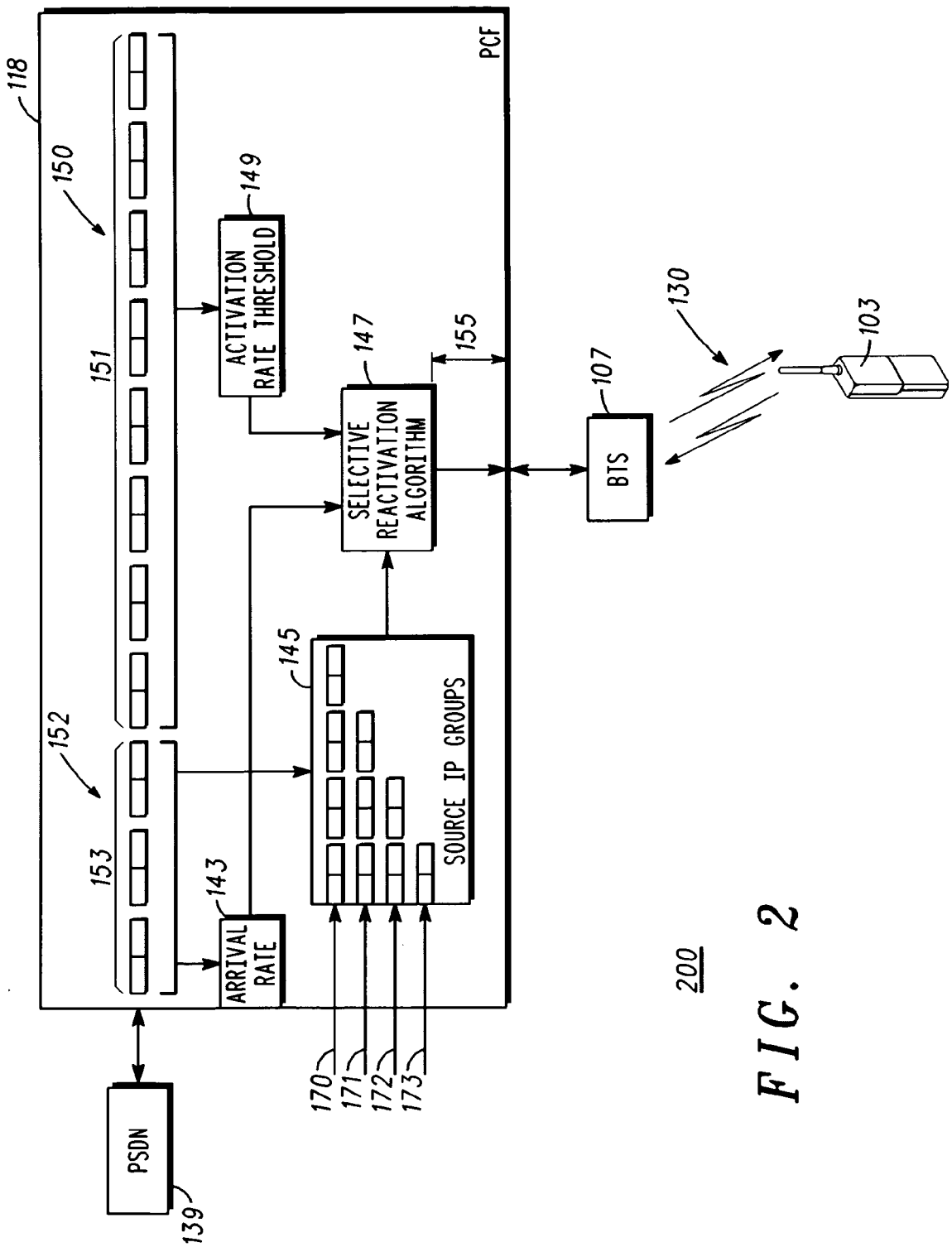
FIG. 2 representatively illustrates a more detailed block diagram of a wireless communication system in accordance with an exemplary embodiment of the present invention.

FIG. 2 representatively illustrates a more detailed block diagram of a wireless communication system 200 in accordance with an exemplary embodiment of the present invention. Only one BTS 107 and one mobile station 103 are shown for clarity. However, other BTS's and mobile stations may be included and be within the scope of the invention.

As shown in FIG. 2, the plurality of packets 160 arriving at the RAN may be processed by the PCF 118. In an embodiment, plurality of packets 160 may include any number of data packets, for example, IP packets. In an embodiment, the PCF 118 creates a sliding window average over a time interval of plurality of packets arriving that request the reactivation of a dormant data session of a dormant mobile station 103. Based on this average, a dynamic threshold may be created such that any single time interval in which the arrival rate of packets requesting reactivation exceed the dynamic threshold, the PCF may discard a number of packets from one or more source IP addresses such that the arrival rate falls below the dynamic threshold.

In an embodiment, incoming packets may be buffered such that PCF 118 examines incoming plurality of packets over a previous time interval to determine what packets to discard during the current time interval. During normal operation of RAN 104, the reactivation rate of dormant mobile stations (number of reactivations per unit time) remains fairly constant when averaged over a short period of time. A surge in reactivation rates may be detected when the variance in reactivation rate relative to a short term average exceeds a predefined limit. At the onset and for the duration of a surge, the source address of those data packets associated with reactivation requests may be analyzed to determine the total number of reactivation requests per unit time associated with each source IP address.

In an embodiment, to determine if a surge condition exists, the arrival rate of packets requesting reactivation can be compared with a multiple of the short term average of reactivation requests from a previous time interval. For example and without limitation, if the reactivation rate over a five second time interval is ten reactivations per second, then a surge in reactivation requests may be defined as a multiple of this number, say five to six times, or fifty to sixty reactivations in a one second time interval.

If a surge condition is detected, PCF 118 may examine packets requesting reactivation and identify the source address(es) most responsible for the surge condition and discard those packets such that they are never processed and do not reactivate a dormant mobile station. For example, packets may be sorted into groups from high number of packets to low number of packets based on their source IP address. The group of packets from a single source IP address with the highest number of packets may be discarded and the algorithm re-run if necessary to discard the group of packets with the next highest number of packets based on source IP address. This may continue until enough packets are discarded to alleviate the surge condition. The packets that are not discarded may be processed as normal and reactivate a dormant mobile station.

As shown in FIG. 2, PCF 118 may receive a first plurality of packets 150 over a first time interval 151. First time interval 151 may be selected to suit a given application. For example and without limitation, first time interval 151 may be approximately five seconds. First plurality of packets 150 may be data packets that are coupled to request a reactivation of a dormant mobile station 103. Based on the number of first plurality of packets 150 requesting reactivation received in first time interval 151, an average number of reactivation requests received in a given time interval, for example one second, may be calculated. From this, activation rate threshold 149 may be calculated. In an embodiment, activation rate threshold 149 may be a multiple of the average of the arrival rate of first plurality of packets (first plurality of packets 150 received over first time interval 151). In other words, activation rate threshold 149 may be a multiple of the average number of reactivation requests received in a given time interval. The multiple number (multiplier) may be chosen such that activation rate threshold 149 represents the point at which a surge condition is imminent. In other words, the average arrival rate may be calculated over first time interval 151 and this average arrival rate in a given time period may be multiplied by a multiplier to yield activation rate threshold 149. For example, if the average arrival rate over the first time interval 151 is ten reactivation requests per second over a five second time interval (first time interval 151), then activation rate threshold may be a multiple of the ten reactivation requests per second as described above.

In an embodiment, PCF 118 may buffer and store a second plurality of packets 152 received in a second time interval 153 where each of second plurality of packets 152 has a destination IP address 141 coupled to reactivate at least one dormant mobile station 103. Second time interval 153 may be selected to suit a given application. For example and without limitation, second time interval 153 may be approximately one second. In an embodiment, second time interval 153 follows first time interval 151 as shown in FIG. 2. Also, first time interval 151 may be longer than second time interval 153 so as to maintain an adequate sample of reactivation requests for calculating activation rate threshold 149. In another embodiment not shown in FIG. 2, second time interval 153 may be a portion of first time interval 151.

In an embodiment, an arrival rate 143 of second plurality of packets 152 may be calculated. This may be the number of second plurality of packets 152 arriving in second time interval 153. The arrival rate 143 of the second plurality of packets 152 may then be compared to the activation rate threshold 149 calculated above. If the arrival rate 143 exceeds the activation rate threshold 149, then the second plurality of packets 152 may be separated into a plurality of source IP groups 145 according to their respective source IP addresses. For example, the portion of second plurality of packets 152 having the most number of packets from one source IP address may be grouped into a source IP group having the highest number 170 of second plurality of packets. The portion of second plurality of packets 152 having next highest number of packets from another source IP address may be grouped into a source IP group having a next highest number 171 of second plurality of packets, and so on for next highest numbers 172, 173. Any number of groups of second plurality of packets may be created for plurality of source IP groups 145. Further, any number of a portion of second plurality of packets may be included in each of source IP groups 145. In an embodiment, if the arrival rate 143 of second plurality of packets 152 is less than the activation rate threshold 149, then the second plurality of packets 152 may proceed to be processed by PCF and reactivate one or more dormant mobile stations 103.

In an embodiment, a selective reactivation algorithm 147 may progressively discard in descending order, one of the plurality of source IP groups 145 having a highest number of second plurality of packets until the arrival rate 143 is below the activation rate threshold 149. In an embodiment, progressively discarding in descending order may include discarding one or more source IP groups having the highest number 170 of second plurality of packets 152 all at once. In this embodiment, selective reactivation algorithm 147 may evaluate which of the plurality of source IP groups 145 should be discarded to bring the arrival rate 143 below the activation rate threshold 149 and then discard the one or more plurality of source IP groups all at once.

In another embodiment, progressively discarding in descending order may include discarding the source IP group having the highest number 170 of second plurality of packets 152 and then comparing the arrival rate 143 of the second plurality of packets 152 in the second time interval 153 without the discarded source IP group, to the activation rate threshold 149. If the arrival rate of the second plurality of packets 152 in the second time interval 153 without the discarded source IP group still exceeds the activation rate threshold 149, the source IP group having the next highest number 171 of second plurality of packets 152 may be discarded. Comparing and discarding source IP groups in descending order based on number of second plurality of packets 152 in the source IP group may iteratively continue until the arrival rate 143 falls below the activation rate threshold 149.

In an embodiment, during a third time interval 155, any of second plurality of packets 152 not discarded may be processed and allowed to reactivate one or more dormant mobile stations 103. In effect, discarding any of the second plurality of packets 152 in one or more of the source IP groups 145 has the effect of preventing the discarded packets from being processed and reactivating a dormant mobile station 103.

In an embodiment, a protected sender may be defined such that any packets from the protected sender may be allowed to pass through and be processed by the PCF 118 to allow reactivation of a dormant mobile station 103. A packet from a source IP address of a protected sender may be prevented from being separated into one of the plurality of source IP groups 145 and subsequently discarded. This allows packets from one or more protected senders to not be classified as malicious packets and activate one or more dormant mobile stations 103.

In an embodiment, first time interval 151, which is used to calculate activation rate threshold 149 is a sliding window average over a time interval of plurality of packets arriving that request the reactivation of a dormant data session of a dormant mobile station 103. In other words, first time interval is not fixed, but continues to update with the most current data. This allows for updating the average number of reactivation requests received over first time interval 151. This allows for activation rate threshold 149 to be dynamic and change with time. A dynamic activation rate threshold 149 prevents the erroneous discarding of reactivation requests that may otherwise be legitimate as the average number of reactivation requests can change over time.

Figure 3:
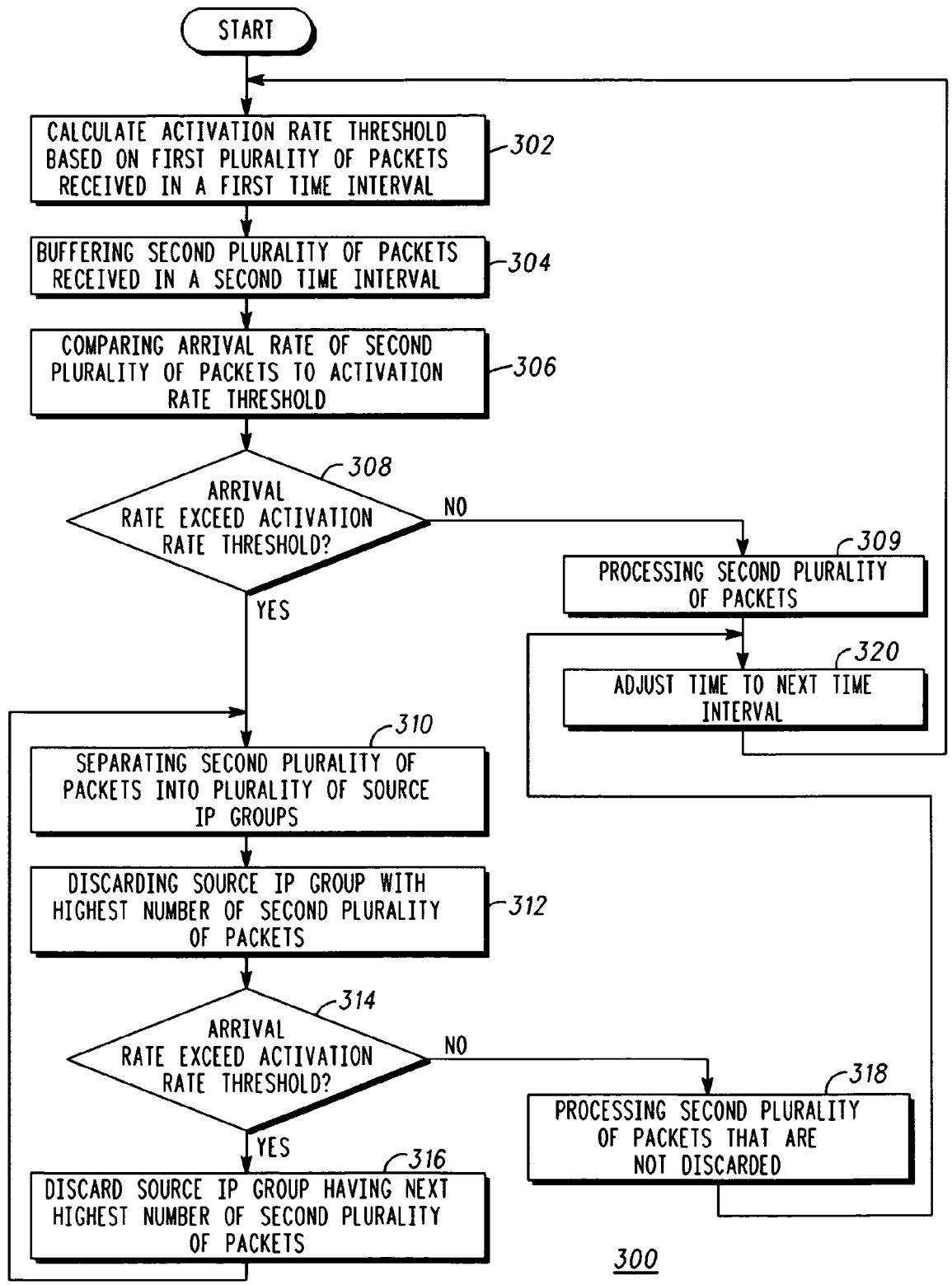
FIG. 3 representatively illustrates flow diagram in accordance with an exemplary embodiment of the present invention.

FIG. 3 representatively illustrates flow diagram 300 in accordance with an exemplary embodiment of the present invention. In this embodiment, the flow is invoked for each time step. In step 302, the PCF calculates the activation rate threshold as a function of first plurality of packets received over a first time interval, where the first plurality of packets are coupled to reactivate at least one dormant mobile station.

In step 304, a second plurality of packets received over a second time interval are buffered, where each of the second plurality of packets has a destination IP address coupled to reactivate at least one dormant mobile station. In step 306, the arrival rate of the second plurality of packets in the second time interval is compared to the activation rate threshold. In step 308, it is determined if the arrival rate exceeds the activation rate threshold. If the arrival rate in step 308 does not exceed the activation rate threshold, then in step 309 all of the second plurality of packets may be processed without discard and allowed to reactivate one or more mobile devices in a dormant state. The process then adjusts to the next time step in step 320.

If the arrival rate exceeds the activation rate threshold in step 308, then in step 310 the second plurality of packets are separated into a plurality of source IP groups based on their respective source IP address. The process then begins progressively discarding in descending order one of the plurality of source IP groups having a highest number of second plurality of packets until the arrival rate is below the activation rate threshold. In step 312, the source IP group having the highest number of second plurality of packets is discarded. Subsequently, in step 314, it is determined if the arrival rate of the second plurality of packets in the second time interval without the discarded IP source group (highest, next highest, and the like) is above the activation rate threshold. If not, then the second plurality of packets that are not discarded are processed and allowed to reactivate one or more dormant mobile stations per step 318.

If the arrival rate is still greater than the activation rate threshold in step 314, then the source IP group having the next highest number of second plurality of packets is discarded per step 316. Steps 314 and 316 may iteratively repeat themselves, discarding the source IP group having the next highest number of second plurality of packets, until the arrival rate without the discarded packets falls below the activation rate threshold and the process proceeds to step 318. In step 318, the second plurality of packets that are not discarded are processed and allowed to reactivate one or more mobile stations in a dormant state. The process then ends for this invocation and enters the next time interval where the process may be repeated.

Although the embodiment depicted in FIG. 3 illustrates the recalculation of the arrival rate after discarded each IP source group, this is not limiting of the invention. Selective reactivation algorithm may evaluate which of the plurality of source IP groups should be discarded to bring the arrival rate below the activation rate threshold and then discard the one or more plurality of source IP groups all at once.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. A method of selective dormant data session reactivation in a radio access network, comprising:

calculating an activation rate threshold as a function of a first plurality of packets received over a first time interval, wherein the first plurality of packets are coupled to reactivate at least one dormant mobile station and wherein the first plurality of packets are received by a packet control function that communicates the plurality of packets between the at least one dormant mobile station and a Packet Data Serving Node;

buffering by the packet control function a second plurality of packets received in a second time interval, wherein each of the second plurality of packets has a destination IP address coupled to reactivate the at least one dormant mobile station;

comparing by the packet control function an arrival rate of the second plurality of packets in the second time interval to the activation rate threshold;

if the arrival rate exceeds the activation rate threshold, the packet control function:

separating the second plurality of packets into a plurality of source IP groups according to their respective source IP addresses;

discarding a one of the plurality of source IP groups having a highest number of the second plurality of packets;

iteratively performing the following steps until arrival rate is below the activation rate threshold:

comparing the arrival rate of the second plurality of packets in the second time interval without the one of the plurality of source IP groups, to the activation rate threshold; and if the arrival rate of the second plurality of packets in the second time interval without the one of the plurality of source IP groups exceeds the activation rate threshold, discarding a one of the plurality of source IP groups having a next highest number of the second plurality of packets.

2. The method of claim 1, further comprising during a third time interval, the packet control function processing the second plurality of packets not discarded, wherein the third time interval follows the first and second time intervals.

3. The method of claim 1, wherein the second time interval follows the first time interval.

4. The method of claim 3, wherein the first time interval is longer than the second time interval.

5. The method of claim 1, wherein the second time interval is a portion of the first time interval.

6. The method of claim 1, wherein the activation rate threshold is a multiple of the first plurality of packets received over the first time interval.

7. The method of claim 1, wherein discarding one of the plurality of source IP groups comprises preventing the plurality of second packets in the one of the plurality of source IP groups from reactivating the dormant mobile station.

8. The method of claim 1, further comprising defining at least one protected sender, wherein any of the second plurality of packets received from the at least one protected sender are prevented from being discarded.

* * * * *